(12) United States Patent
Soukhojak (10) Patent No.: US 8,999,481 B2
(45) Date of Patent: Apr. 7, 2015

(54) CERAMIC HONEYCOMB FILTER WITH ENHANCED THERMAL SHOCK RESISTANCE

(75) Inventor: Andrey N. Soukhojak, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 944 days.

(21) Appl. No.: 13/132,508

(22) PCT Filed: Dec. 16, 2009

(86) PCT No.: PCT/US2009/068153
§ 371 (c)(1),
(2), (4) Date: Jun. 2, 2011

(87) PCT Pub. No.: WO2010/080412
PCT Pub. Date: Jul. 15, 2010

(65) Prior Publication Data
US 2011/0236628 A1    Sep. 29, 2011

Related U.S. Application Data

(60) Provisional application No. 61/138,743, filed on Dec. 18, 2008.

(51) Int. Cl.
| | | |
|---|---|---|
| B01D 46/24 | (2006.01) | |
| C04B 35/185 | (2006.01) | |
| C04B 35/478 | (2006.01) | |
| F01N 3/022 | (2006.01) | |
| C04B 38/00 | (2006.01) | |
| C04B 111/00 | (2006.01) | |

(52) U.S. Cl.
CPC ............ C04B 35/185 (2013.01); *F01N 2330/60* (2013.01); *F01N 3/0222* (2013.01); C04B 38/0009 (2013.01); *C04B 2111/00793* (2013.01); *C04B 2111/0081* (2013.01); *C04B 2235/322* (2013.01); *C04B 2235/349* (2013.01); *C04B 2235/78* (2013.01)

(58) Field of Classification Search
None
See application file for complete search history.

(56) References Cited

U.S. PATENT DOCUMENTS

| | | | |
|---|---|---|---|
| 3,983,283 | A | 9/1976 | Bagley |
| 4,127,691 | A | 11/1978 | Frost |
| 4,135,018 | A | 1/1979 | Bonin |
| 4,323,614 | A | 4/1982 | Gulati |
| 4,448,828 | A | 5/1984 | Mochida |
| 6,843,822 | B2 | 1/2005 | Beall |
| 7,128,961 | B2 * | 10/2006 | Kai et al. ...................... 428/116 |
| 7,259,120 | B2 | 8/2007 | Ellison |
| 2004/0166035 | A1 * | 8/2004 | Noda et al. .................... 422/180 |

* cited by examiner

*Primary Examiner* — David Sample
*Assistant Examiner* — Nicholas W Jordan (57) ABSTRACT

Thermal shock resistance of a ceramic honeycomb structure is increased through modifications of the cell wall joints. Wall joints can be modified such that a longitudinally-extending opening is created, putting two or more cells that meet at the wall joint in fluid communication through such opening. In such a case, all walls that meet at such a modified joint must join at least one other wall at that joint. Alternatively, wall joints can be modified by providing stress concentrating notches which extend into the joint from two or more cells that share the joint.

7 Claims, 5 Drawing Sheets

CERAMIC HONEYCOMB FILTER WITH ENHANCED THERMAL SHOCK RESISTANCE

This application claims priority from U.S. Provisional Application No. 61/138,743, filed 18 Dec. 2008.

This invention relates to ceramic honeycomb structures that have enhanced thermal shock resistance.

Honeycomb-shaped structures that have thin-walled, open-ended cells are widely used in applications such as emission control devices, especially in vehicles that have internal combustion engines. These structures also are used as catalyst supports.

Honeycomb structures for high temperature applications often have the problem of inadequate thermal shock resistance. Thermal shock resistance is the ability of the honeycomb structure to withstand thermal shock events such as large, rapid changes in temperature and/or significant temperature gradients between different regions within the structure. Thermal shock resistance is related to the coefficient of thermal expansion of the material of construction and the critical tensile strain of that material. Many materials that are otherwise good candidates for manufacturing honeycomb structures exhibit somewhat high coefficients of thermal expansion and low critical tensile strains. This combination of properties can lead to inadequate thermal shock resistance when the material is formed into a honeycomb structure.

Acicular mullite is an example of such a material. Acicular mullite has very good mechanical strength and in addition forms a very high surface area body because it crystallizes to form a mass of interconnected needles. However, the thermal shock resistance of acicular mullite tends to be less than desired.

There are two general approaches to increasing the thermal shock resistance of these honeycomb structures. The first approach looks at varying the materials of construction. This usually involves the selection of materials that have lower coefficients of thermal expansion and/or higher critical tensile strains. The problem with this approach is that improvements in thermal shock resistance usually come at the expense of other desirable properties. Porosity or surface area is lost in some cases. In still other cases, the new material cannot be processed into a honeycomb structure easily using inexpensive extrusion methods.

The second approach involves modifying the honeycomb structure itself. The idea is that by modifying the cell walls or the shape of the cells in some way, the structure can become better able to alleviate stresses that accrue during thermal shock events, and therefore will become less susceptible to failure. In short, the modifications tend to build greater flexibility into the structure.

U.S. Pat. No. 3,983,283 describes a honeycomb structure having square cells. The corners are eliminated from some of the cells to form discontinuities in the honeycomb structure. The discontinuities allow it to better absorb the compressive and tensile forces which are created when the structure undergoes rapid temperatures changes. The elimination of corners has the effect of placing sets of four cells into fluid communication with each other. The arrangement of the discontinuities makes the structure incompatible with wall flow filtration, which requires that inlet and outlet channels in the structure be separated. In addition, many of the walls have cantilevered "free" ends which are unattached to other structures and are therefore unsupported at one end. These free ends are susceptible to damage.

U.S. Pat. Nos. 4,127,691 and 4,448,828 describe honeycomb structures based on a square cell design. The modification is that specific walls are eliminated, so that two adjacent square cells are combined to form a larger, rectangular cell with an aspect ratio of 2:1. The remaining cell walls can be modified to form hexagonal cells while preserving the approximate 2:1 aspect ratio. In U.S. Pat. No. 4,448,828, the cell walls are eliminated only in the center of the structure. This approach increases thermal shock resistance, but at the expense of a significant decrease in surface area due to the elimination of the cell walls.

The honeycomb structure described in U.S. Pat. No. 4,323,614 has slightly curved cell walls, which helps to increase the thermal shock resistance of the structure at the cost of increased hydraulic resistance.

U.S. Pat. Nos. 6,843,822 and 7,259,120 describe honeycomb structures with square cells. The cells are arranged in patterns of alternating larger and smaller cells, in order to increase the capacity to store soot and ash while maintaining good gas flow rates.

What is desired is to provide a monolithic ceramic honeycomb structure that has good thermal shock resistance, a high surface area, a structure that is compatible with wall flow filtration and which can be produced using low-cost manufacturing methods such as extrusion.

In one aspect, this invention is a monolithic ceramic honeycomb structure comprising multiple longitudinally-extending cells defined by walls that meet to form wall joints common to at least three cells;

wherein a portion of the wall joints are modified wall joints, which modified wall joints each contain a longitudinally-extending opening such that at least two longitudinally-extending cells are in fluid communication through the longitudinally extending opening at each of such modified wall joints, provided that all walls meeting at a modified wall joint are longitudinally joined to at least one other wall at the modified wall joint.

In another aspect, this invention is a monolithic ceramic honeycomb structure comprising multiple longitudinally-extending cells defined by walls that meet to form wall joints that are common to at least three cells;

wherein a portion of the wall joints are notched joints that have two longitudinally-extending, crack-directing stress-concentrating notches, each of the concentrating notches extending into and partially through the thickness of the notched joint from a different cell.

In specific embodiments, the honeycomb structure may combine features of each of the foregoing aspects, containing both modified joints that define openings between some of the cells, and notched joints that have crack-directing stress concentration notches. In such an embodiment, the modified wall joints may be congregated into one or more discrete sections of the structure, and the notched wall joints may be congregated into one or more different sections of the structure. In an especially preferred arrangement, modified wall joints are present in a central portion of the structure, and notched joints are present in a more peripheral section of the structure, such that the peripheral section having notched joints partially or entirely encircles the central section having modified joints.

Figure 1:
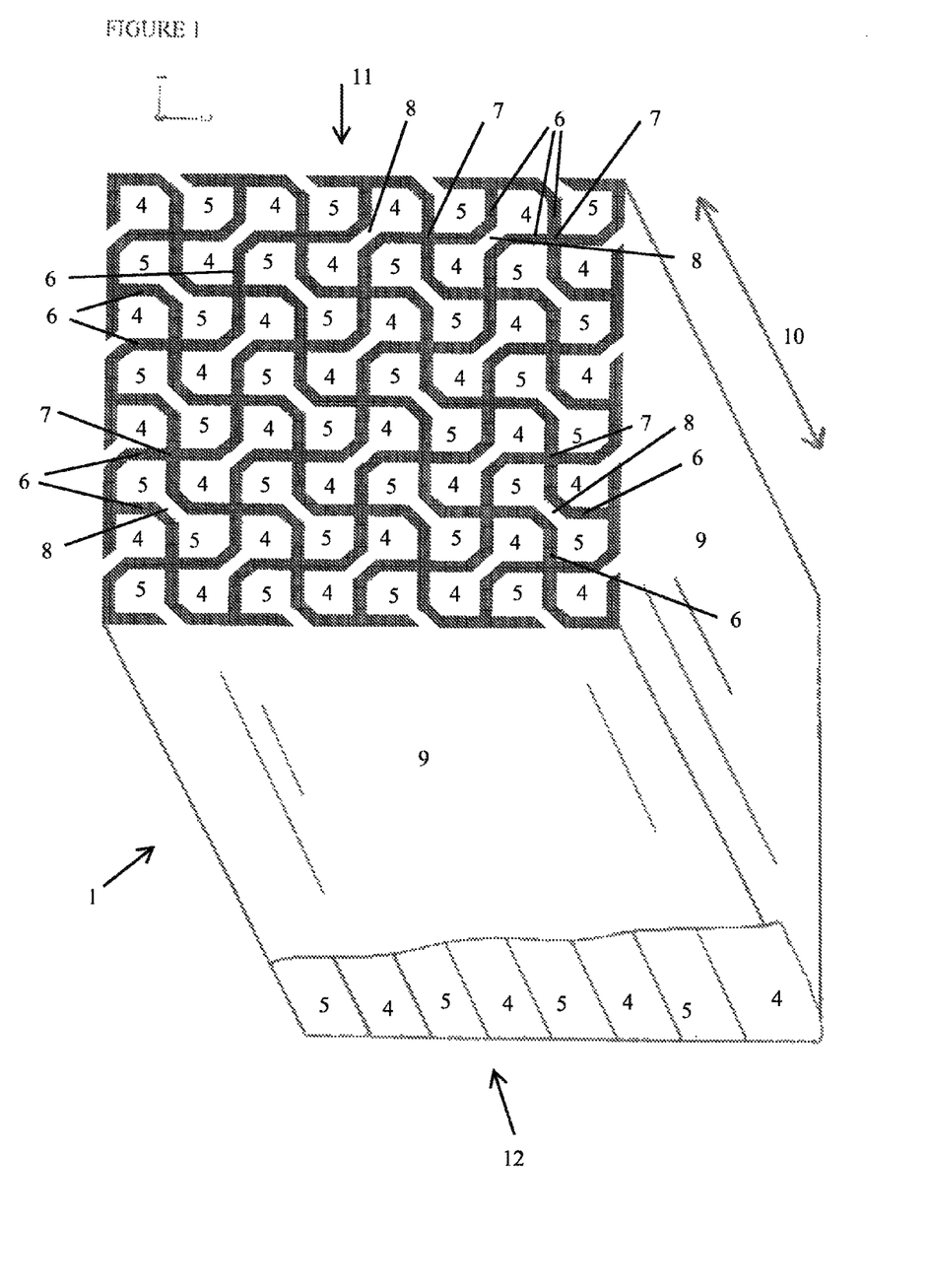
FIG. 1 is an isometric view, partially in section, of an embodiment of a honeycomb structure of the invention, which has modified wall joints with longitudinally-extending openings.

In FIG. 1, monolith 1 is comprised of multiple horizontally extending cells 4 and 5, each of which is defined by walls, some of which are indicated by reference numerals 6. Walls 6 meet at unmodified joints, some of which are indicated by reference numerals 7, and modified joints, some of which are indicated by reference numerals 8. Each modified joint 8 has a longitudinal opening through which two or more cells 4 or two or more cells 5, which share such modified joint 8, are in fluid communication.

Walls 6, unmodified joints 7 and modified joints 8 each extend longitudinally through monolith 1, such that each cell 4, cell 5, wall 6, unmodified joint 7 and modified joint 8 has substantially uniform dimensions throughout the longitudinal extension of monolith 1. Thus, any cross-sectional surface of monolith 1, taken in a direction perpendicular to the longitudinal extension, will have essentially the same profile. The direction of the longitudinal extension of monolith 1 is indicated by arrow 10 in FIG. 1.

Figure 1A:
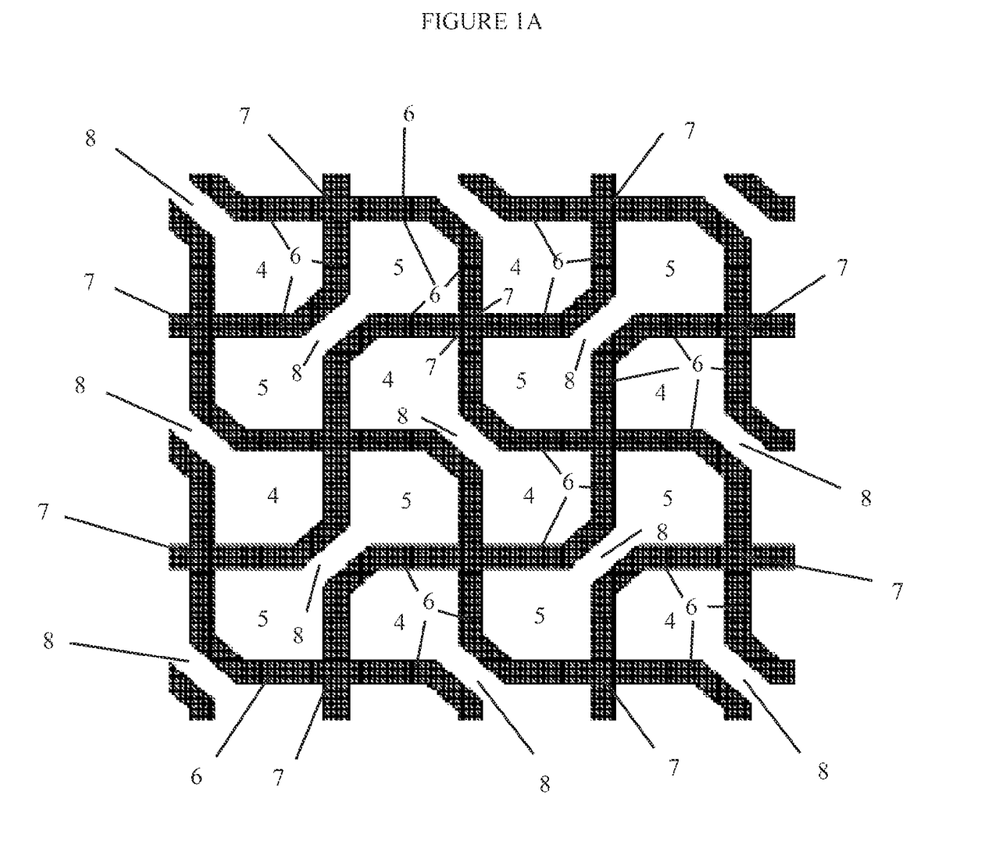
FIG. 1A is an enlarged top view of the honeycomb structure of FIG. 1.

As shown in FIGS. 1 and 1A, all walls 6 that meet at a modified joint 8 join with at least one other wall at the modified joint. This joining of the walls extends throughout the longitudinal length of the modified joint 8. Because all walls are joined with at least one other wall at each modified joint 8, the structure has no cantilevered or "free" wall ends which can be structurally weak.

The periphery of monolith 1 is covered with skin 9, which serves to prevent fluid from escaping from the sides of monolith 1. Skin 9 can be an integral skin, formed from the same ceramic material that makes up the rest of the structure and preferably formed simultaneously therewith. Alternately, skin 9 can be a post-applied material such as a metal wrap that is applied to monolith 1 after the cell structure has been formed.

The presence of openings in modified joints 8 increases the thermal shock resistance of the honeycomb structure by reducing its rigidity, so the structure is better capable of accommodating thermal shock events such as rapid changes in temperature and/or large temperature gradients within the body. Some loss in mechanical strength is seen, but this loss in mechanical strength tends to be proportionately smaller than the gain in thermal shock resistance. In many practical applications, some loss of mechanical strength can be tolerated if the monolith has better thermal shock resistance.

Modifying some of the joints between walls to create openings, rather than eliminating those joints, creates certain benefits. Mechanical strength is potentially better than if the joints are simply eliminated, because the honeycomb structure does not have cantilevered "free" wall ends that can be damaged easily. More significantly, the wall surface area is minimally impacted, or not impacted at all, by the presence of the modified joints. A third benefit is that the size and shape of the cells is at most only slightly changed as a result of providing openings in some of the joints. Because of this, there is little or no impact on hydraulic resistance.

Monolithic honeycomb structures of the invention may have a set of cells that perform a specific function, and at least one other set of cells that perform a different function. It is common, for example in filtration and/or catalysis applications, for one set of cells to function as inlet cells, into which a fluid is introduced when the honeycomb structure is used, and another set of cells to function as outlet cells, through which the fluid is withdrawn from the honeycomb structure. Thus, for example, cells 4 in FIGS. 1 and 1A often will have a different function than cells 5. In any event, any set of cells that are in fluid communication through a modified joint 8 should perform the same function in the monolith, such as, for example, being inlet or outlet cells. In the embodiment shown in FIGS. 1 and 1A, for example, cells 4 may function as inlet cells and cells 5 may function as outlet cells. Cells having different functions generally will not be in fluid communication through a modified joint such as modified joint 8 in FIG. 1 and FIG. 1A.

In the embodiments shown in FIGS. 1 and 1A, no cell 4 or cell 5 is in fluid communication with more than one other cell through a modified joint 8.

The maximum concentration of modified joints that have longitudinally-extending openings is limited in any particular case by the need to provide mechanical integrity in the honeycomb structure. In addition, if different cells have different functions with the honeycomb structure, the number of modified joints will generally be limited so that only cells having the same function will be in liquid communication through openings in modified joints. This maximum concentration of modified joints for any given structure will depend somewhat on the geometrical arrangement of cells. Honeycombs in which four walls come together to form joints typically can contain up to 50% modified joints, not counting joints at the exterior boundaries of the monolith which typically are all unmodified or otherwise blocked off to prevent leakage from the sides of the device. Thus, up to 50% of the joints can be modified joints in square, rhombic and triangular hexagonal honeycombs. The maximum concentration of modified joints may be lower than 50% for some cell geometries, such as hexagonal honeycombs or triangular honeycombs.

Any lower concentration of the joints in a honeycomb structure can be modified to provide the longitudinally-extending openings. Thus, for example, as few as 1% of the joints in a particular honeycomb can be modified. The number of modified joints can be, for example, at least 2%, at least 5%, at least 10%, at least 20% or at least 25%, up to the maximum concentration of joints that can be modified given the particular cell geometry of a honeycomb.

It is not necessary to distribute the modified joints uniformly throughout the honeycomb structure, and in some cases there may be advantages to having a non-uniform distribution. Modified joints such as joints 8 in FIGS. 1 and 1A most effectively increase thermal shock resistance when they are located in regions of the monolith that experience the strongest compressive forces during thermal shock event such as rapid temperature changes or large temperature gradients within the honeycomb structure. In many cases, the strongest compressive forces are experienced near the center of the body (i.e., proximate to the central longitudinal axis of the body), because the thermal expansion of the center is constrained by the periphery of the structure. Therefore, in some embodiments, the modified joints are concentrated solely or mainly in a central region of the body, proximate to the central longitudinal axis of the body, while one or more peripheral regions of the body contain either no modified joints or else contain a lower concentration of modified joints. The concentration of modified joints can in these cases decrease continuously, or in one or more discrete steps, from the central longitudinal axis of the body toward the periphery.

A continuously increasing or decreasing distribution of the concentration of modified or notched wall joints from one region to another within the monolith may be beneficial. This is because a continuously increasing or decreasing distribution potentially can better follow a continuous distribution of temperature within the honeycomb, thus effectively reducing the thermal stresses in the structure while keeping the overall strength of the structure at the required level. Because the honeycomb structure is made of a finite number of discrete cells, the actual placement of modified or notched wall joints can only approximate a continuously decreasing or increasing distribution. A dithering algorithm can be applied to identify a discrete distribution of modified and/or notched wall joints that closely approximates a desired continuous distribution of those wall joints.

An optimum distribution of wall joints within a particular honeycomb structure will depend on various factors, including, for example, the particular honeycomb geometry, the specific application for which the honeycomb will be used, the overall strength that is required in the application, the magnitude and/or frequency of thermal shock events that the honeycomb is designed to withstand, etc. Therefore, it is impossible to specify one distribution of concentration of wall joints that would be optimal in all plausible cases. A dithering algorithm can take these factors or other relevant factors into account to produce a discrete distribution of modified and/or notched cells which produces a honeycomb having an optimized or balanced set of properties.

Various dithering algorithms are known and used in various digital audio and digital photograph applications. These algorithms can be applied to produce a discrete distribution of modified and/or notched wall joints within a honeycomb structure, subject to various input parameters. Threshold, random, patterning and error-diffusion algorithms are all useful. Error-diffusion algorithms are especially useful. Examples of suitable dithering algorithms include the Floyd-Steinberg, Jarvis, Judice, Ninke, Stucki, Burkes, Scolorg, Sierra, two-row Sierra, Filter Lite, Atkinson, Riemersma and Hilbert-Peano dithering, and even-toned screening. Other dithering algorithms are also known and are also useful.

Figure 5:
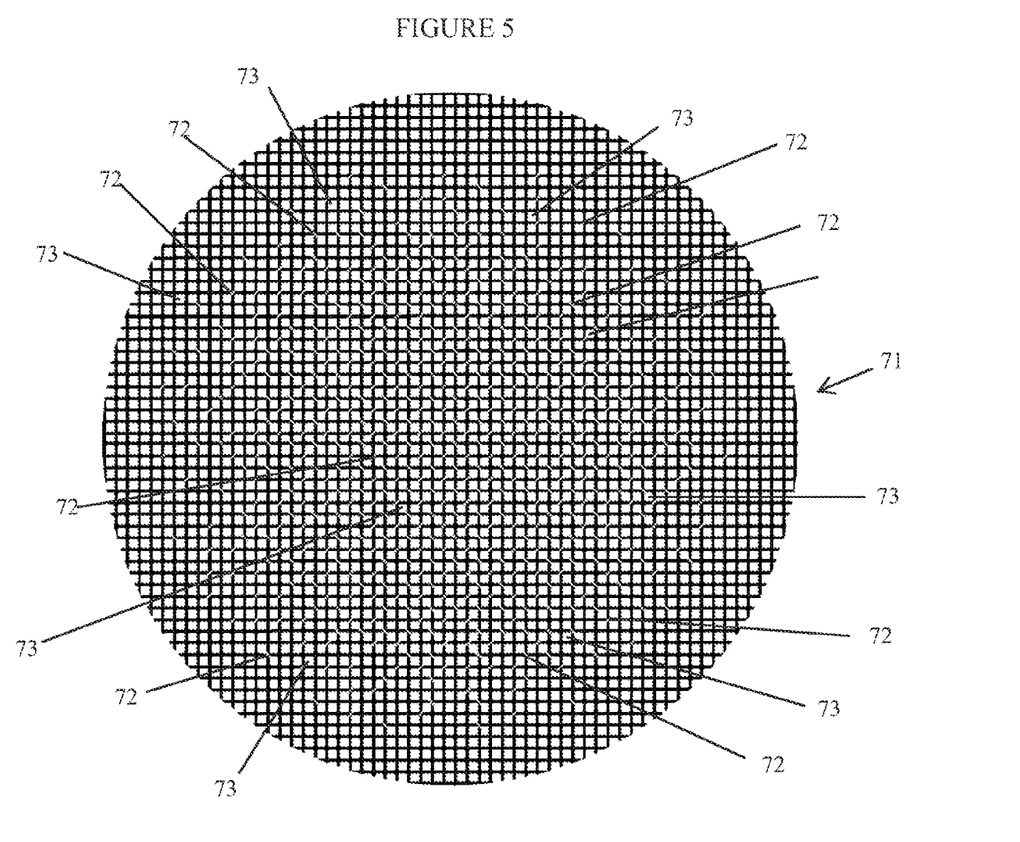
FIG. 5 is a top view of another embodiment of a honeycomb structure of the invention, which has different concentration (i.e. probability of a wall joint in a given section of a structure to be a modified wall joint) of modified wall joints in various sections of the structure.

FIG. 5 illustrates an embodiment of the invention in which the concentration of modified joints varies within a honeycomb structure. In FIG. 5, honeycomb structure 71 includes cells such as cells 72. Each of cells 72 in the embodiment shown is substantially square in cross-section with four walls and four corner joints. A portion of the joints are modified joints, such as those indicated by reference numerals 73. The concentration of modified joints is about 50% in the center of honeycomb structure 70. This concentration decreases gradually to zero in the periphery of honeycomb structure 70. FIG. 5 illustrates a preferred arrangement of modified joints, in which more central regions of the structure, which have a higher concentration of modified joints such as joints 73, are each encircled with one or more outer regions which each contain a lower concentration of modified joints such as joints 73.

In the embodiment shown in FIG. 5, the concentration of modified joints decreases in about 3 steps from approximately 50% to 0% of the joints, as one moves radially outward from the center of honeycomb structure 5. In other embodiments, the concentration of modified joints may decrease continuously, or in any lesser or greater number of steps, as one moves radially outwardly from the center of the honeycomb structure. All regions of the honeycomb structure may contain some concentration of modified joints such as joints 73. In other embodiments, the various regions containing different concentrations of modified joints may be arranged in some other pattern, or even randomly.

FIGS. 1, 1A and 5 show a preferred arrangement in which no cell contains more than one modified joint. Honeycomb structures in which a significant number of cells contain more than one modified joint tend to have poorer mechanical strength.

Figure 4:
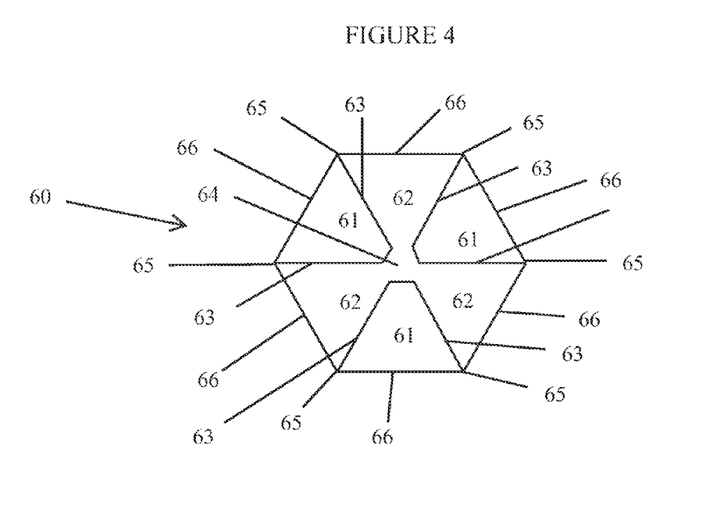
FIG. 4 is a top view of a section of six cells from a triangular honeycomb structure of the invention.

In the embodiments shown in FIGS. 1, 1A and 5, each cell having a modified joint is in fluid communication with only one other cell through that modified joint. This is the preferred arrangement for most honeycomb structures, especially those in which no more than four cells share the modified joints. However, it is possible for cells to be in fluid communication with more than one other cell through a particular modified joint. Honeycomb structures in which six or more cells meet at modified joints are amenable to having more than two cells in fluid communication at a modified joint. FIG. 4 illustrates how three cells can be in fluid communication at a modified joint in a triangular honeycomb structure. In FIG. 4, honeycomb structure section 60 consists of six triangular cells 61 and 62, each of which are made up of walls 63 and walls 66. Cells 62 and 63 share modified joint 64, and each has two unmodified joints 65. Two walls bounding each cell 61 join longitudinally at modified joint 64, along the axial length of the cells, so there are no cantilevered "free" walls in the structure. Three cells 62 are in liquid communication through modified joint 64, whereas cells 61 are not in fluid communication with other cells. Cells 62 should all perform the same function within honeycomb structure 60. Cells 61 individually can perform the same function as cells 62, or can perform a different function. The embodiment shown in FIG. 4 can be modified so that only two cells are in fluid communication through modified joint 64.

FIGS. 1, 1A and 5 illustrate another preferred feature. In FIGS. 1, 1A and 5, the opening in any various modified joints 8 is oriented at an angle to the openings in each of the closest surrounding modified joints 8. This arrangement helps to minimize the risk of crack propagation in a plane parallel to the honeycomb channel direction (longitudinal axis), which, in turn, can lead to failure of the monolith or loss of performance. This angle is in each case preferably from 30 to 150° and is more preferably from 45 to 135°.

Another preferred feature illustrated in FIG. 1A is the presence of somewhat rounded corners at modified joints 8. Rounding corners at modified joints 8 helps to prevent stresses from concentrating at a highly localized position at the modified joint, where there is less mechanical support for the walls, and thus helps prevent unwanted cracking at the modified joints.

Figure 2:
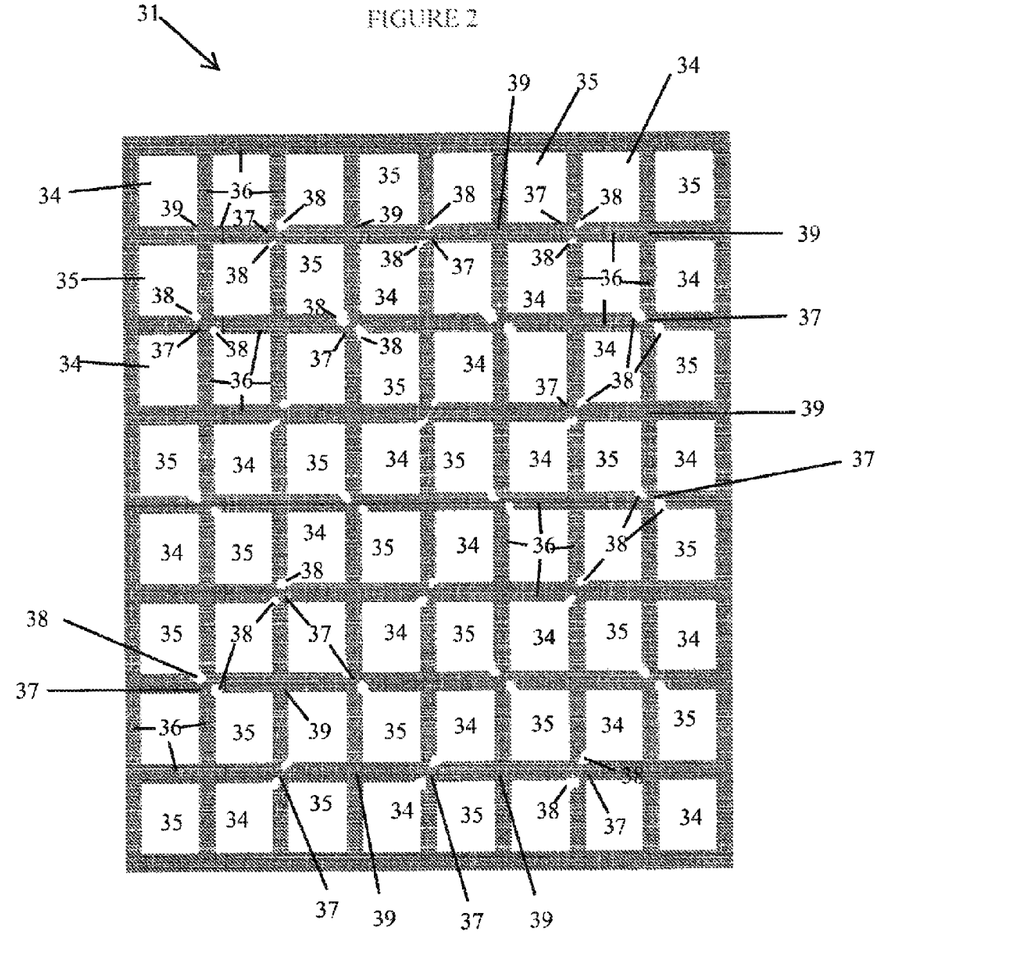
FIG. 2 is an isometric view of another embodiment of a honeycomb structure of the invention, which has notched wall joints.

FIG. 2 illustrates a second aspect of the invention. Monolith 31 is comprised of multiple longitudinally extending cells 34 and 35, each of which in this particular embodiment is a square cell defined by four walls 36. Walls 36 meet at unnotched joints 39 and notched joints 37. Walls 36, unnotched joints 37 and notched joints 37 each extend longitudinally through monolith 31, such that each cell 34, cell 35, wall 36, notched joint 37 and unnotched joint 39 has substantially uniform dimensions throughout the longitudinal extension of monolith 31. Thus, any cross-section of monolith 31, taken in a direction perpendicular to its longitudinal extension, will have essentially the same profile.

Each notched joint 37 has two crack-directing stress concentration notches 38. Stress concentration notches 38 extend for the longitudinal extension of the respective joint and the adjoining cells. Each of the stress concentration notches 38 extends into and partially through the thickness of notched joint 37 from a different cell.

Opposing notches 38 that extend into a particular notched joint 37 may be at an angle of from 30 to 180 degrees to each other, preferably from 90 to 180° to each other. Stress-concentrating notches 38 may have a depth of from about 5 to 75%, more preferably from 10 to 50% of the thickness of walls 36. Stress-concentrating notches 38 do not meet within the joint.

Notches such as notches 38 in FIG. 2 are believed to increase thermal shock resistance of the monolith not by preventing cracking altogether within the structure, but instead by promoting a cracking pattern which preserves the function of the honeycomb structure. Notched joints 37 are mechanically weaker than unnotched joints 39, and will tend to crack before other parts of the honeycomb structure, notably unnotched joints 39, will fail. Therefore, cracks form preferentially within notched joints 37. Stress is therefore relieved in a defined manner without destroying the monolith as a whole or impairing its function.

In addition, stress concentrating notches 38 help to determine the direction of the cracks that form within notched joints 37. When the monolith cracks within a notched joint 37, the crack will tend to extend through the joint, from one of the opposing stress concentration notches to the other. Therefore, cracks that form at a notched joint 37 will tend to form within the joint in a defined manner.

Cracks form within notched joints 37 mainly due to tensile stresses that are created by thermal shock events. Therefore, it is preferable to locate notched joints 37 at least in the regions of the monolith that experience the greatest tensile stresses under those conditions.

A crack that forms within a notched joint 37 may place the adjoining cells that connected by the crack into fluid communication with each other. This may vary from time to time depending on whether the region including the crack is under tension or compression. If the crack is in a region that is under compression, it may remain tightly closed and provide little or no fluid communication between the adjoining cells. However, if the crack is in a region that is under tension, it is possible that an opening will form between the cells at either end of the crack, putting those cells into fluid communication. Notches that extend into a notched joint such as notched joint 37 therefore preferably extend into the notched joint from cells that perform the same function during use of the honeycomb structure, so any such fluid communication between these cells as a result of a crack that forms within the notched joint will have minimal if any adverse affect on the function of monolith. In FIG. 2, for example, two cells 34 or two cells 35 connected through such a crack may be inlet or outlet cells.

In the embodiment shown in FIG. 2, no more than one concentration notch extends from any of the longitudinally-extending cells 34 and 35 into the surrounding joints. This represents the preferred case because, during a thermal shock event, this arrangement disfavors the formation of an extensive crack network through a region of the structure, in a plane parallel to the honeycomb channel direction (longitudinal axis).

In, addition, in the embodiment shown in FIG. 2 a crack that forms within any particular notched joint 37 will tend to connect exactly two cells 34 or two cells 35. Again this is preferred in most cases, especially when no more than four walls meet at a notched joint 37. However, it is possible to provide stress concentration notches extending into a joint from three cells, especially when six or more walls meet at the notch joint, as in a triangular honeycomb structure.

As shown in FIG. 2, the concentration notches 38 for any particular notched joint 37 may be oriented at an angle to the concentration notches 38 for each of the closest surrounding modified joints 37. As with the first aspect, a staggered orientation of the concentration notches helps to prevent large cracks from being produced through many contiguous cells. This angle is in each case preferably from 30 to 150° and is more preferably from 45 to 135°.

It is not necessary to distribute notched joints 37 evenly throughout the body. In many cases, the strongest tensile forces seen due to a thermal shock event are experienced near the periphery of the body. Therefore, in some embodiments, the notched joints are concentrated solely or mainly in a peripheral region of the body, while more central (i.e., proximate to the central longitudinal axis) regions of the body contain either no notched joints or else contain a lower concentration of notched joints. This peripheral region containing notched joints 37 may partially or entirely encircle the central portion of the body. Such an embodiment is shown in FIG. 2. In FIG. 2, only a portion of cells 34 and 35 have notched joints 37. Notched joints 37 in FIG. 2 appear only near the periphery of monolith 31, whereas cells 34 and 35 near the center (i.e. near the central longitudinal axis) of monolith 31 contain no notched joints 37, instead having only unnotched joints 39. The concentration of notched joints can in these cases increases gradually, or in one or more discrete steps, from the central longitudinal axis of the body toward the periphery.

It is also within the scope of the invention to have notched joints appearing throughout the body, in both peripheral and central sections.

Figure 3:
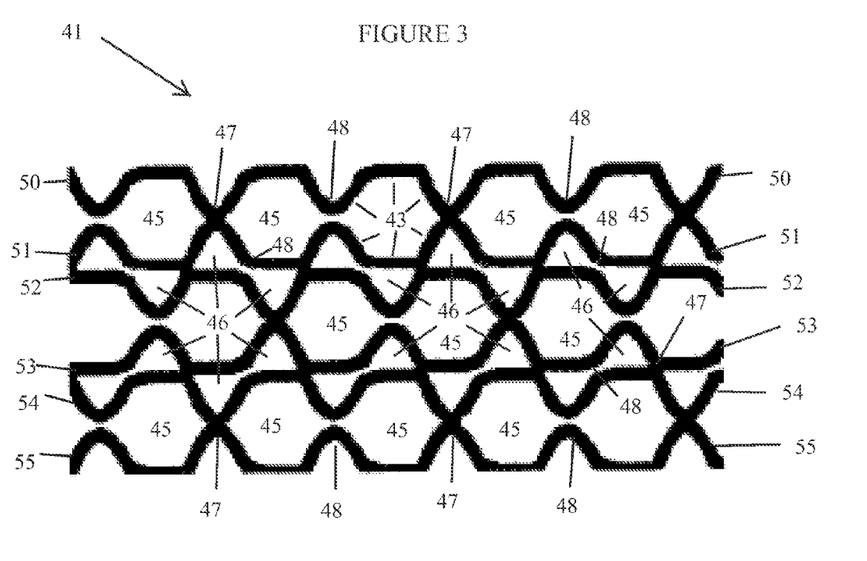
FIG. 3 is a top view of a section of another embodiment of a honeycomb structure of the invention, which has modified wall joints with longitudinally-extending openings.

In certain embodiments of the invention, a honeycomb structure can combine features of both aspects of the invention, i.e., the honeycomb structure can contain joints that are both unmodified and unnotched, such as joints 7 in FIGS. 1 and 1A and joints 39 in FIG. 3, modified wall joints such as modified joints 8 in FIGS. 1 and 1A, and notched wall joints such as notched wall joints 37 of FIG. 2.

In such embodiments, it is generally preferred that the modified and notched joints are arranged such that (1) no cell contains more than one modified joint or more than one notched joint and (2) no cell contains both a modified joint and a notched joint. However, it is possible for the modified joints and notched joints to be arranged so that some cells contain at least two modified joints, two notched joints, or one modified joint and one notched joint.

Any arrangement of the respective types of wall joints can be had, consistent with the structural integrity and function of the honeycomb structure. Preferably, modified joints such as joints 8 in FIGS. 1 and 1A are positioned in portions of the monolith where compressive stresses are expected to predominate during a thermal shock event, whereas notched joints such as notched joints 37 of FIG. 3 are positioned in portions of the monolith where tensile stresses are expected to predominate during a thermal shock event. As mentioned already, compressive stresses tend to predominate and be at their greatest in the central portions of the monolith structure, i.e. near the central longitudinal axis, whereas tensile stresses tend to predominate nearer to the periphery of the monolith structure. Therefore, in a preferred type of arrangement, a portion of the wall joints in a central section of the monolith are modified wall joints as described before, and a portion of the wall joints in a peripheral section of the monolith are notched wall joints as described before. Within the central section, the concentration of wall joints that are modified to provide openings may be constant, or may vary. In some embodiments, the concentration of modified wall joints in the central section may decrease continuously or in one or more steps along a direction from the central longitudinal axis of the body toward the periphery, until at some point within the monolith the concentration of modified wall joints drops to zero. Similarly, with the peripheral section, the concentration of notched wall joints may be constant, or may vary, in this case preferably decreasing continuously or step-wise from the periphery of the monolith towards the central longitudinal axis until the concentration of notched wall joints drops to zero. A monolith containing a central section containing modified wall joints and a peripheral section containing notched wall joints may have an intermediate zone which contains neither modified nor notched wall joints.

The figures are greatly enlarged for purposes of illustration. A typical honeycomb for many filtration or catalysis applications will contain from 25 to 1000 cells/square inch of cross-sectional area (transverse to the longitudinal extension), or about 4 to 150 cells/square centimeter of cross-sectional area. Wall thicknesses are typically from 0.05 to 10 mm, preferably from 0.2 to 1 mm, although larger or smaller wall thicknesses might be used.

The size of the openings in modified joints 8 relative to cells 4 and 5 is exaggerated in FIGS. 1 and 1A, and in all subsequent figures, for purposes of illustration. Openings in modified joints 8 in FIGS. 1 and 2 are suitably small in relation to the dimensions of cells 4 and 5. The width of any opening in a modified joint 8 is suitably from 0.01 to 0.5 times, preferably 0.1 to 0.25 times, the longest cross-sectional dimension of the cells which it connects. Cracks formed in notched joints can be even thinner, and can be substantially closed off when the notched joint is under compression.

FIGS. 1 and 2 show an optional arrangement of cells within the honeycomb structure, in which cells which may have differing functions form an alternating pattern. In FIG. 1, all walls 6 that define cells 4 are shared with various adjacent cells 5, and all walls that define cells 5 are shared with various adjacent cells 4. In this type of pattern, each cell 4, except for those at the periphery of the structure, is bounded on all sides by cells 5, and each cell 5, again except for those at the periphery of the structure, is bounded on all sides by cells 4. Cells 34 and 35 exhibit a similar pattern in FIG. 2. Such an arrangement lends itself to filter applications, which depend on the permeation of a fluid through porous walls between adjacent cells. In such a design, cells 4 and 34 typically will have different functions than cells 5 and 35, respectively. Cells 4 and 34 may be inlet cells, for example, and cells 5 and 35 may be outlet cells.

Cells 4 and 5 (FIGS. 1 and 1A), cells 34 and 35 (FIG. 2) and cells 72 (FIG. 5) are illustrated as squares, but the cells can be any desirable shape, consistent with manufacturing and application constraints. Examples of suitable cell configurations include square, rhombic (diamond shaped), octasquare, hexagonal, triangular (as in FIG. 4), and triangular hexagonal. FIG. 3 illustrates a possible arrangement of unmodified and modified wall joints in a triangular hexagonal cell structure. In FIG. 3, monolith 41 contains hexagonal cells 45 and triangular cells 46, each defined by multiple walls 43. Walls 43 meet at unmodified wall joints 47 and at modified wall joints 48. In FIG. 3, 50% of the wall joints are modified, such that each hexagonal cell 45 is in fluid communication with one adjacent hexagonal cell 45 through an opening in a shared modified joint 48, and each triangular cell 46 is in fluid communication with one adjacent triangular cell though an opening in a shared modified joint 48. In an arrangement such as is illustrated in FIG. 3, the hexagonal cells 45 may perform one function, such as being an inlet or outlet, and triangular cells 46 may perform a different function. For example, hexagonal cells 45 may be inlet cells and triangular cells 46 may be outlet cells, or vice versa. Note that each pair of joined hexagonal cells 45 are surrounded by triangular cells 46, and each pair of joined triangular cells 45 is surrounded by hexagonal cells 45. As before, this alternating arrangement of cells lends itself to wall flow filtration applications. Also as before, cells which are in fluid communication through an opening in a shared modified joint 48 each should perform the same function.

In a common configuration, certain cells in the monolith will perform one function while at least one other set of cells in the monolith will form a second function. A first set of cells can function as inlet cells and another set of cells can function as outlet cells. Thus, in FIGS. 1 and 1A, cells 4 may function as inlet cells and cells 5 may function as outlet cells. In such a case, the monolith typically will include caps which are provided at or near an outlet end 12 of cells 4 of monolith 1, and at or near an inlet end 11 of cells 5. This capping arrangement establishes a direction of flow through the device. During operation, a fluid enters cells 4 of monolith 1 at inlet end 13, permeates through walls 6 of cells 4 into adjacent cells 5 and exit cells 5 at outlet end 12 of monolith 1. Similar capping schemes can be applied to monolith structures as shown in FIGS. 2, 3, 4 and 5 to establish a direction of flow through the device and to establish certain of the cells as inlet cells and other as outlet cells. Cells in fluid communication with each other through an opening in a modified joint or through a crack in a notched joint should perform the same function within the honeycomb structure.

The honeycomb structure is made of a ceramic material. The nature of the ceramic material that is used may depend somewhat on the particular end-use application for which the honeycomb structure is intended. The ceramic material preferably is one which is made from powdered raw materials that can be formed into a plasticized mixture, extruded to form the honeycomb structure, and then debindered and fired. Extrusion is the most common method of forming honeycomb structures. However other honeycomb forming methods, such as pleating, stacking or folding of corrugated sheets of ceramic precursors, can be employed to form the honeycomb structures described in the present invention. Acicular mullite, cordierite, cordierite-spinel, spodumeme, silicon carbide, aluminum titanate-based materials as described in U.S. Pat. No. 7,259,120, and other ceramics are all useful. The invention is of particular interest for making bodies of a ceramic that has a somewhat high coefficient of thermal expansion, such as acicular mullite.

Cell walls such as walls 6 in FIGS. 1 and 1A, walls 36 in FIG. 2 and walls 43 of FIG. 3 may be porous for some applications. Porosity is important in filtration applications, because the walls themselves act as the filter, trapping particles as a fluid passes through the pores in the cell walls. Porosity also increases the available surface area for catalytic applications. Acicular mullite or a mixture containing acicular mullite and another ceramic material such as cordierite are especially useful materials for making honeycomb structures with porous cell walls.

The honeycomb structure preferably is manufactured by extruding a plasticized precursor material, which is then fired to produce the ceramic. The plasticized precursor material is extruded through a die which defines the various cells, walls, modified walls and notched walls. General methods for designing dies are well-known, and described, for example, in U.S. Pat. No. 3,983,283. Those methods are generally useful herein, with modifications as needed to provide modified wall joints and/or notched wall joints, as desired.

It is also possible to form the honeycomb structure by extruding or otherwise forming a series of angled sheets, stacking the sheets to form the desired cell structure with unmodified joints, modified joints and/or notched joints, and then debindering and firing the stacked assembly. In FIG. 3, for example, sheets 50, 51, 52, 53, 54 and 55 can be separately extruded or otherwise formed, stacked together to form the indicated honeycomb structure, and then debindered and fired to produce monolith 41.

The presence of modified wall joints with openings increases the compliance of the monolith at the expense of its overall strength. Thermal shock resistance, in turn, tends to increase with increased compliance. In general, compliance will increase and overall strength will decrease with increasing concentration of modified wall joints. Surprisingly, compliance increases faster than overall strength decreases. The added compliance therefore increases the thermal shock resistance of the monolith, at a surprisingly small cost in terms of overall strength.

The monolith can be used as a particulate filter, especially for removing particulate matter from power plant (mobile or stationary) exhaust gases. A specific application of this type is a soot filter for an internal combustion engine, especially a diesel engine.

Functional materials can be applied to the composite body using various methods. The functional materials may be organic or inorganic. Inorganic functional materials, particularly metals and metal oxides, are of interest as many of these have desirable catalytic properties, function as sorbents or perform some other needed function. One method of introducing a metal or metal oxide onto the composite body is by impregnating the body with a solution of a salt or acid of the metal, and then heating or otherwise removing the solvent and, if necessary calcining or otherwise decomposing the salt or acid to form the desired metal or metal oxide.

Thus, for example, an alumina coating or a coating of another metal oxide is often applied in order to provide a higher surface area upon which a catalytic or sorbent material can be deposited. Alumina can be deposited by impregnating the composite body with colloidal alumina, followed by drying, typically by passing a gas through the impregnated body. This procedure can be repeated as necessary to deposit a desired amount of alumina. Other ceramic coatings such as titania can be applied in an analogous manner.

Metals such as barium, platinum, palladium, silver, gold and the like can be deposited on the composite body by impregnating the body (which is preferably coated with alumina or other metal oxide) with a soluble salt of the metal, such as, for example, platinum nitrate, gold chloride, rhodium nitrate, tetraamine palladium nitrate, barium formate, followed by drying and preferably calcination. Catalytic converters for power plant exhaust streams, especially for vehicles, can be prepared from the composite body in that manner.

Suitable methods for depositing various inorganic materials onto an acicular mullite body are described, for example, in US 205/0113249 and WO2001045828. These processes are generally in relation to the composite body of this invention.

In an especially preferred embodiment, alumina and platinum, alumina and barium or alumina, barium and platinum can be deposited onto the composite body in one or more steps to from a filter that is simultaneously capable of removing particulates such as soot, $NO_x$ compounds, carbon monoxide and hydrocarbons from a power plant exhaust, such as from vehicle engines.

EXAMPLE 1

A large-scale honeycomb structure is made to model the invention. The honeycomb structure is in accordance with the invention, and is made in the general configuration shown in FIGS. 1 and 1A. The honeycomb is in the form of a square, 10 cm on a side. There are approximately 6.4 cells per square centimeter. 50% of the wall joints, including those on the periphery of the honeycomb structure, are modified wall joints as shown in FIG. 1. The honeycomb is made by printing in a gypsum based powder using a 3D rapid prototyping printer ZPrinter® 310 Plus by Z Corporation. The powder is impregnated with cyanoacrylate glue and allowed to harden.

For comparison, a honeycomb is made in the same manner, except that all cells are square with all of the wall joints being unmodified.

Each of the samples is compressed in an Instron 5543 test frame with a 1 kN load cell. The true compliance of the honeycomb of the invention is 0.207 mm/kgf. The maximum load to failure is 2.57 mm/kgf and the displacement at failure is 0.64 mm.

The true compliance of the comparative honeycomb is only 0.005 mm/kgf. Therefore, the true compliance of the honeycomb of the invention is about 41 times that of the comparative honeycomb. The maximum load to failure of the comparative honeycomb is 63 kgf, or about 24.4 times that of the honeycomb of the invention. The ratio of compliance increase to strength decrease is 1.68, which indicates that the modified structure is able to accommodate without failure substantially higher non-uniform thermal strains arising during thermal shock events compared to an unmodified structure with all other things being equal. The displacement at failure for the comparative honeycomb is only 0.48 mm. The ratio of the displacements at failure of the modified and unmodified honeycomb structures (0.64/0.48=1.33) is equal to the ratio of the maximum applied overall (as opposed to local strains in honeycomb walls) uniaxial compressive strains that the structures can accommodate without failing. This translates into roughly 33% higher temperature difference between the center and the periphery a modified honeycomb structure can withstand without failing compared to an unmodified honeycomb structure with all other things being equal.

Because a large concentration of the joints throughout the entire structure of Example 1 are modified, and there is no skin or wrap about the periphery of the structure, the presence of the modified wall joints has a very large effect on the strength and compliance in this example. The presence of a skin or wrap, or the presence of a lower concentration of modified joints, will tend to reduce the effect of the modified joints, both in terms of increasing compliance and in reducing the maximum load to failure. However, the benefit in compliance will remain greater than the loss of strength. In addition, the number and placement of the modified joints can be modified to balance compliance and strength for a given material of construction.

EXAMPLE 2

50 parts of a ball clay and 50 parts of kappa-Alumina are dry-blended and then mixed with 7 parts methylcellulose in a sigma blade mixer. 48 parts of a 10% by weight methylene glycol/water solution are added slowly with mixing. Keeping the temperature below 27° C., the mixture is blended until it forms a homogenous paste. The paste is permitted to age for 4 hours at room temperature in a sealed container, reblended for 10 minutes and then loaded into an extruder. It is extruded through a 1.5 inch×1.5 inch (3.8 cm×3.8 cm) square die to form a body having cells arranged in a dumbbell pattern as shown in FIG. 1. Extrudate length is 7 inches (18 cm). There are about 15 cells per inch (about 6 per centimeter). The extrudate is fired to produce an acicular mullite body in which the cell walls are porous. The body is suitable for filtration and catalyst support applications.

The invention claimed is:

1. A monolithic ceramic honeycomb filter comprising multiple longitudinally-extending cells defined by porous walls that meet to form wall joints that are common to at least three cells; wherein a portion of the wall joints are modified wall joints, which modified wall joints each contain a longitudinally extending opening such that at least two longitudinally-extending cells are in fluid communication through the longitudinally extending opening at each of such modified wall joints, provided that all walls meeting at a modified wall joint are longitudinally joined to at least one other wall at the modified wall joint and said longitudinally extending cells are comprised of inlet and outlet cells with the inlet and outlet cells are not in fluid communication through the modified wall joint.

2. The honeycomb filter of claim 1 wherein the longitudinally-extending cells include a first set of cells that perform a first function and at least one other set of cells that perform a second function, and all longitudinally-extending cells that are in fluid communication through a longitudinally-extending opening at a particular modified wall joint perform the same function.

3. The honeycomb filter of claim 2, wherein no cell is in fluid communication with more than one other cell through a longitudinally-extending opening in a modified wall joint.

4. The honeycomb filter of claim 3, wherein the concentration of modified joints varies within the honeycomb structure.

5. The honeycomb filter of claim 4, wherein the honeycomb structure contains at least one region proximate to the central longitudinal axis of the structure and at least one more peripheral region that partially or entirely encircles the central region, and the concentration of modified joints in the central region is higher than in at least one peripheral region.

6. The honeycomb filter of claim 4 wherein the ceramic is acicular mullite, cordierite, cordierite-spinel, spodumeme, silicon carbide or an aluminum-titanate-based material.

7. The filter of claim 1, which is a soot filter for an internal combustion engine.

* * * * *